(12) United States Patent
Hill

(10) Patent No.: US 12,299,834 B2
(45) Date of Patent: May 13, 2025

(54) SYSTEM AND METHOD FOR CREATING AND FURNISHING DIGITAL MODELS OF INDOOR SPACES

(71) Applicant: City Furniture, Inc., Tamarac, FL (US)

(72) Inventor: Andrew James Hill, Tamarac, FL (US)

(73) Assignee: City Furniture, Inc., Tamarac, FL (US)

( * ) Notice: Subject to any disclaimer, the term of this patent is extended or adjusted under 35 U.S.C. 154(b) by 242 days.

(21) Appl. No.: 17/871,405

(22) Filed: Jul. 22, 2022

(65) Prior Publication Data

US 2023/0044630 A1    Feb. 9, 2023

Related U.S. Application Data

(60) Provisional application No. 63/224,823, filed on Jul. 22, 2021.

(51) Int. Cl.
| | |
|---|---|
| *G06T 19/20* | (2011.01) |
| *G01S 17/89* | (2020.01) |
| *G06Q 30/0601* | (2023.01) |
| *G06T 7/10* | (2017.01) |
| *G06T 7/60* | (2017.01) |
| *G06T 17/20* | (2006.01) |
| *G06T 19/00* | (2011.01) |
| *G06V 10/764* | (2022.01) |

(52) U.S. Cl.
CPC ............. *G06T 19/20* (2013.01); *G01S 17/89* (2013.01); *G06Q 30/0643* (2013.01); *G06T 7/10* (2017.01); *G06T 7/60* (2013.01); *G06T 17/20* (2013.01); *G06T 19/006* (2013.01); *G06V 10/764* (2022.01); *G06Q 30/0633* (2013.01); *G06T 2200/08* (2013.01); *G06T 2200/24* (2013.01); *G06T 2207/10028* (2013.01); *G06T 2210/04* (2013.01); *G06T 2210/12* (2013.01); *G06T 2210/21* (2013.01); *G06T 2210/56* (2013.01); *G06T 2219/2004* (2013.01)

(58) Field of Classification Search
None
See application file for complete search history.

(56) References Cited

U.S. PATENT DOCUMENTS

2021/0334538 A1* 10/2021 Marotta ................. G06V 20/20
2023/0221120 A1* 7/2023 Bina .................... G06Q 10/087
                                                                   702/150

* cited by examiner

*Primary Examiner* — Yi Wang
(74) *Attorney, Agent, or Firm* — Fish & Richardson P.C.

(57) ABSTRACT

Systems and methods for creating a digital model of an indoor space and virtually furnishing the digital model are described. A data collection device photographs or scans an indoor space and produces dimensional data using collected data. The system further includes a pre-processing process, a planes process, a move to origin process, and a segmentation process that analyze and process the dimensional data to create a digital model of the indoor space. The digital model is saved to a database and is viewable on a display and includes a visual scale that corresponds to the spatial dimensions of the indoor space. The system also detects objects present in the indoor space for removal from the digital model. The system also allows creation and placement of visual object representations for display in the digital model.

18 Claims, 7 Drawing Sheets

SYSTEM AND METHOD FOR CREATING AND FURNISHING DIGITAL MODELS OF INDOOR SPACES

CROSS-REFERENCE TO RELATED APPLICATIONS

This application is a nonprovisional application of and claims priority from U.S. provisional patent application Ser. No. 63/224,823 filed on Jul. 22, 2021. The foregoing applications are incorporated in their entirety herein by reference.

FIELD OF THE INVENTION

The invention relates to virtual modeling of a room, other indoor space, and objects present in such indoor spaces. More particularly, the invention relates to systems, software, and methods for creating a digital model of a room or other indoor space and virtually furnishing the digital model with visual object representations corresponding to real objects.

BACKGROUND

Furniture retail and interior decoration are significant industries in America and other countries. While current retail and e-commerce websites allow customers to shop online for furniture and décor, they do not permit shoppers to quickly and easily understand whether a particular item of furniture or décor will fit within an intended space for such item within a particular room or other indoor space. In addition to not allowing shoppers to easily determine whether the dimensions of the item can be accommodated by a particular room or a particular space within the room, such websites also do not permit shoppers to visualize what the item being considered for purchase would look like both dimensionally and aesthetically within the room or space within the room without actually purchasing the item and placing it within that room or space within the room.

Such digital modeling systems, devices, and methods also are unavailable using quick and simple means in other industries that have a need for tools that require spatial reasoning. For example, in addition to the retail furniture and décor industry, such systems, devices, and methods would also be useful in warehouse equipment and placement, construction placement, architecture, space optimization, mechanical engineering, photography and videography and framing of a scene, and in the fashion industry for the design of clothing and fashion accessories as well as comparisons of the same.

A need exists for systems, devices, and methods that create a digital model of an actual room or other indoor space using dimensions that correspond to the scale of the dimensions of the room or indoor space. Another need exists for systems, devices, and methods that allow for the dimensions of a room or other indoor space to quickly and easily be measured and recorded. A further need exists for systems, devices, and methods that allow a digital model of the room or indoor space to be furnished with visual digital representations of items of furniture and décor that match the appearance and dimensions of real items of furniture or décor. Still a further need exists for systems, devices, and methods that allow visual digital representations of furniture and décor appearing in a digital model of a room or indoor space to be purchased. Yet further needs exist for systems, devices, and methods similar to the foregoing for use in industries and services related to furniture, home décor, interior design, warehouse equipment and placement, construction placement, architecture, space optimization, mechanical engineering, photography and videography, and fashion.

SUMMARY

The invention relates to a system for creating a digital model of an indoor space and virtually furnishing the digital model is described. The system includes a user computing device, which includes a camera, a remote sensing device for measuring spatial dimensions of an indoor space, a remote computing device, and a database having an object file containing object data related to a real object for displaying a visual object representation corresponding to the real object's shape and dimensions. The remote sensing device receives and analyzes at least one image of an indoor space captured by the camera and produces dimensional data using image data. The system further includes a 3D space modeling process that analyzes and processes the dimensional data to create a digital model of the indoor space. The digital model is viewable as a visual model representation on a display. The digital model includes a visual scale that corresponds to the spatial dimensions of the indoor space. The system also includes an interactive placement process for positioning a visual object representation selected from the database into the visual model representation to create an object/model image that is viewable on the display.

The invention also relates to a machine learning system for creating a digital model of an indoor space. The machine learning system includes a user computing device having at least one data collection device photographs or scans an indoor space and produces dimensional data using collected data. The machine learning system further includes a pre-processing process for identifying and removing outlier data contained in the data received from the user computing device and for classifying the data to add a classification relating to a type of object in the indoor space, a planes process for creating a digital model of the indoor space from pre-processed data received from the pre-processing process, a move to origin process for aligning the digital model to an origin point within a digital environment, and a segmentation process for defining structural elements in the digital model that correspond to the real structural elements of the indoor space. These processes analyze and process the dimensional data to create a digital model of the indoor space. The digital model is saved to a database and is viewable on a display and includes a visual scale that corresponds to the spatial dimensions of the indoor space. The system may remove objects detected in the digital model that correspond to real objects that were present in the indoor space when it was scanned (e.g., furniture) but that are not structural elements of the digital model that correspond to real structural elements of the indoor space (e.g., walls, floors, and ceilings).

The machine learning system also may create visual object representations of real objects present in the indoor space when it is photographed or scanned by the at least one data collection device. The machine learning system may also be used to create visual object representations of other objects not present in the indoor space but which a user may wish to purchase for furnishing the indoor space, e.g., furniture or home décor items for sale by a merchant. The visual object representations are selectable for placement and display in the digital model, and the digital model may also be modified to remove visual object representations displayed therein.

The systems and methods described herein provide an advantage in that they create a digital model of an actual room or other indoor space using dimensions that correspond to the scale of the dimensions of the room or indoor space. The systems and methods described herein provide another advantage in that they allow for the dimensions of a room or other indoor space to quickly and easily be measured and recorded. The systems and methods described herein also provide an advantage in that they allow a digital model of the room or indoor space to be furnished with visual digital representations of items of furniture and décor that match the appearance and dimensions of real items of furniture or décor. The systems and methods described herein provide still another advantage in that they that allow visual digital representations of furniture and décor appearing in a digital model of a room or indoor space to be purchased. The systems and methods described herein provide yet another advantage in that they are useful for modeling indoor spaces and objects placed or stored therein, or desired to be placed or stored therein, in industries and services related to furniture, home décor, interior design, warehouse equipment and placement, construction placement, architecture, space optimization, mechanical engineering, photography and videography, and fashion.

Accordingly, the invention features a system for creating a digital model of an indoor space and virtually furnishing the digital model. The system includes a user computing device, a remote sensing device, a communications network, and a database. The user computing device includes a processor and associated memory and a camera. The remote sensing device measures spatial dimensions of an indoor space. The remote sensing device is communicatively connected to the user computing device and analyzes at least one image of an indoor space captured by the camera. The at least one image includes image data from which the remote sensing device produces dimensional data. The communications network transmits the dimensional data to the remote computing device. The database includes an object file that is or includes object data related to a real object for displaying a visual object representation corresponding to the real object's shape and dimensions. The system also includes a 3D space modeling process that analyzes and processes the dimensional data to create a digital model of the indoor space. The digital model is viewable as a visual model representation on a display that is connected to a computing device. The digital model includes a visual scale, as represented in the visual model representation, that corresponds to the spatial dimensions of the indoor space. The system further includes an interactive placement process for positioning the visual object representation selected from the database into the visual model representation to create an object/model image that is viewable on the display.

In another aspect, the invention can feature the remote sensing device being or including a lidar device or other scanning device for scanning the indoor space to collect data that is transmitted to the remote computing device for creation of the digital model.

The invention also features a system for processing data obtained from photographing or scanning an indoor space to create a digital model of the indoor space. The system includes a file extraction process, a pre-processing process, a planes process, a segmentation process, and a write/save process. The file extraction process extracts data from a data source transmitted by a computing device to a remote computing device. The data source is or includes data related to an indoor space that is collected by at least one of a camera, a lidar device, and a dimensional scanner. Extracted data is created from the data processed by the file extraction process. The pre-processing process identifies and removes outlier data contained in the extracted data received from the file extraction process and classifies the extracted data to add a classification relating to a type of object in the indoor space. Pre-processed data is created from the extracted data processed by the pre-processing process. The planes process creates a digital model of the indoor space from the pre-processed data received from the pre-processing process. The planes process creates planes in the digital model that correspond to real structural elements of the indoor space. The segmentation process defines structural elements in the digital model that correspond to the real structural elements of the indoor space. The write/save process writes and saves the digital model in a database.

In another aspect, the invention can feature the system further including a computing device, wherein the computing device includes a processor, an associated memory, and at least one data collection device for collecting data related to the indoor space.

In another aspect, the invention can feature the at least one data collection device being or including a camera, a lidar device, or another scanning device for scanning the indoor space to collect data.

In another aspect, the invention can feature the planes process creating a point cloud from the pre-processed data. The planes process refines the point cloud to create the digital model, which is or includes a mesh model of the indoor space.

In another aspect, the invention can feature the planes process identifying holes and gaps in and between planes of the mesh model and modifying the mesh model to correct any holes and gaps therein.

In another aspect, the invention can feature the structural elements being or including planes in the digital model corresponding to the real structural elements. The real structural elements are walls, floors, ceilings, and other structural surfaces in the indoor space.

In another aspect, the invention can feature the planes process identifying one or more digital objects that are not structural elements in the digital model and creating a bounding box around each of the one or more digital objects to prevent the one or more digital objects from colliding with and overlapping one another and the structural elements in the digital model.

In another aspect, the invention can feature a digital object removal process for removing one or more digital objects from the digital model. The one or more digital objects are not structural elements in the digital model.

In another aspect, the invention can feature the planes process creating point clouds and mesh planes using preprocessed data and the segmentation process creating the digital model in a final format that is viewable on a display screen that is communicatively connected to the computing device or to another computing device.

In another aspect, the invention can feature the system further processing the data to create a visual object representation corresponding to a shape and dimensions of a real object located in the indoor space.

In another aspect, the invention can feature the segmentation defining structural elements and objects in the digital model by making an identification determination for each plane and object in the digital model. The identification determination is or includes an identification that a plane is a floor, ceiling, wall, or another structural element of the indoor space or an identification that an object is detected in the digital model that does not correspond to one of the real structural elements of the indoor space.

In another aspect, the invention can feature the system further including a move to origin ("MTO") process for positioning the digital model at an origin point to align the digital model to a default camera view.

In another aspect, the invention can feature the digital model being displayable and editable via a user interface displayed on a display screen of the computing device or another computing device.

The invention also features a system for creating a digital model of an indoor space and objects present in the indoor space. The system includes a computing device, one or more remote computing devices, and a communications network. The computing device includes a processor, an associated memory, and at least one data collection device for collecting data related to the indoor space. The at least one data collection device is or includes a camera, a lidar device, or another scanning device for scanning the indoor space to collect data related to structural elements of the indoor space, an object present in the indoor space, or both. The system further includes a pre-processing process, a planes process, a segmentation process, and a write/save process. The pre-processing process identifies and removes outlier data contained in the data received from the computing device and classifies the data to add a classification relating to a type of the object in the indoor space. Pre-processed data is created from the data processed by the pre-processed process. The planes process creates a digital model of the indoor space from the pre-processed data received from the pre-processing process. The planes process creates planes in the digital model that correspond to real structural elements of the indoor space. The segmentation process defines structural elements in the digital model that correspond to the real structural elements of the indoor space. The write/save process writes and saves the digital model in a database. The computing device transmits the data collected by the at least one data collection device via the communications network to the one or more remote computing devices for processing by the pre-processing process, the planes process, and the segmentation process to create the digital model of the indoor space. The digital model is viewable and editable on a display screen of the computing device, the one or more remote computing devices, or another computing device.

In another aspect, the invention can feature the system further including a move to origin ("MTO") process for positioning the digital model at an origin point to align the digital model to a default camera view.

In another aspect, the invention can feature the segmentation process defining structural elements and objects in the digital model by making an identification determination for each plane and object in the digital model. The identification determination is or includes an identification that a plane is a floor, ceiling, wall, or another structural element of the indoor space or an identification that an object is detected in the digital model that does not correspond to one of the real structural elements of the indoor space.

A method of the invention can be used for creating a digital model of an indoor space. The method includes the steps of: (a) collecting data related to an indoor space, wherein collecting the data includes the step of photographing, scanning, or both photographing and scanning the indoor space using at least one data collection device; (b) creating a digital model of the indoor space, and (c) writing and saving the digital model in a database from which the digital model is accessible for viewing on a display screen.

Step (b) of the method includes the steps of: (i) identifying and removing outlier data contained in the data received from the at least one data collection device to create pre-processed data; (ii) creating the digital model of the indoor space from the pre-processed data by creating planes in the digital model that correspond to real structural elements of the indoor space; and (iii) defining structural elements in the digital model that correspond to the real structural elements of the indoor space. Defining the structural elements in the digital model includes the step of making an identification determination for each plane in the digital model. The identification determination is or includes an identification that a plane is a floor, ceiling, wall, or another structural element of the indoor space.

Another method of the invention can include the step of (d) collecting data related to an object, wherein collecting the data includes the step of photographing, scanning, or both photographing and scanning the object using the at least one data collection device.

Another method of the invention can include the step of (e) creating a visual object representation of the object, wherein creating the visual object representation includes the steps of: (i) identifying and removing outlier data contained in the data received from the at least one data collection device to create pre-processed data; (ii) classifying the data to add a classification relating to a type of the object; (iii) creating the visual object representation from the pre-processed data by creating planes in the digital model that correspond to a shape and scaled size of the object; and (iv) positioning the visual object representation in the digital model.

Another method of the invention can include the step of (f) writing and saving the visual object representation in a database from which the visual object representation is accessible for viewing on a display screen and for repositioning within or removal from the digital model.

Another method of the invention can include the object being a real object that is not a structural element of the indoor space. The visual object representation is or includes a digital object having characteristics that correspond to characteristics of the real object.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
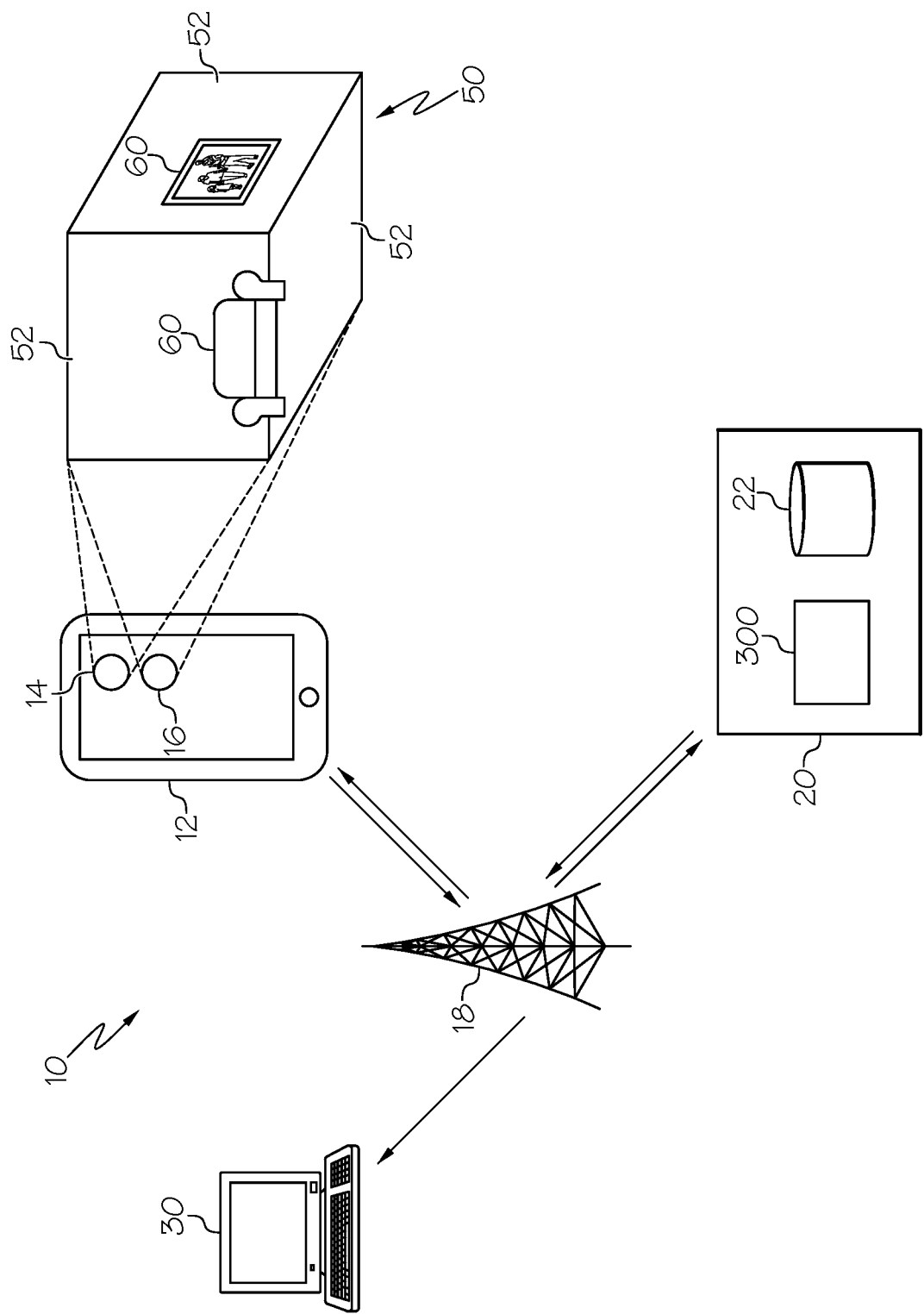
FIG. 1 is a schematic diagram of a system for creating a digital model of an indoor space and detecting an object present therein.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

As used herein, the term "computing device" generally refers to any device having a processor, memory, and a storage device that may execute instructions such as software. The term "computing device" includes, but is not limited to, a single personal computer, portable computer, laptop computer, virtual machine, virtual container, host, server, tablet computer, and/or mobile device (e.g., a smartphone) or to a plurality of such devices working together to perform the function described as being performed on or by the computing device. Computing devices may include a network interface such as a card, chip, or chip set that allows for communication over a wired and/or wireless communications network. The computing devices may run an operating system.

As used herein, the term "processor" means processing devices, programs, circuits, components, systems, and subsystems, whether implemented in hardware, software or both, and whether or not programmable. The term "processor" includes, but is not limited to, one or more computing devices, hardwired circuits, signal modifying devices and systems, devices and machines for controlling systems, central processing units, programmable devices and systems, field programmable gate arrays, application specific integrated circuits, systems on a chip, systems composed of discrete elements and/or circuits, state machines, virtual machines, data processors, processing facilities, and combinations of any of the foregoing.

As used herein, the term "application" (also referred to herein as an "app") refers to one or more computing modules, programs, processes, workloads, threads, and/or a set of computing instructions executed by a computing device. Software modules, software objects, software instances, and/or other types of executable code provide several examples of applications.

As used herein, the term "data" includes entire computer readable files or portions of a computer readable file, whether permanent or temporary. The data may include or represent text, numbers, symbols, other indicia, data, images, photographs, graphics, animations, audio, video, multimedia, voice, computer programs, computer source code, computer object code, executable computer code, other information, and/or a combination of two or more of the foregoing.

As shown in FIGS. 1-5, the invention provides a system 10 for creating a digital model 510 of an indoor space 50 and virtually furnishing the digital model. The system 10 includes a user computing device 12 having a processor and associated memory, a camera 14, a remote sensing device 16, a communications network 18, a remote computing device 20, a database 22, a 3D space modeling process, and an interactive placement process. The system has the ability to capture data from user computing devices (e.g., one of Apple's iOS smartphones that includes at least one camera and a lidar device) to generate accurate spatial dimension data with collision-based meshing through machine learning. The system enhances and changes the rendered digital space created from the dimensional data into an interactive digital space with 3D digital models to provide users with a unique experience for designing their room 50 or other indoor space 50 with full control and awareness of spatial reasoning. The system 10 is useful for measuring dimensions (e.g., length, width, and height) of a room 50 or another indoor space 50 and creating a digital model 510 of the room or other indoor space. For convenience and not for purposes of introducing any limitation on the scope of the invention, unless specified otherwise and except where context clearly requires a different interpretation, the term "room" 50 as used herein shall mean a room, a portion of a room, another indoor space, or a portion of an indoor space, and in all cases refers to a real room or space. The digital model 510 created by the system 10 is a digitally interactive and accurate dimensional model produced using the data received by the system. In an exemplary embodiment, a machine learning process 300 of the system 10 determines the dimensions of the room 50, isolates the walls, floor, and ceiling planes, and creates a collision mesh to ensure that one or more digital objects 514, which correspond to real objects 60 (e.g., furniture and décor items) within the room, are defined and confined to a certain area or location within the digital model 510 that corresponds to the area or location of each digital object's corresponding real object within the room. The collision mesh is also referred to as a collision model and is used to model three-dimensional (3D) bodies or objects 60 such as furniture, décor, and architectural and structural elements 52 such as walls, floors, and ceilings.

In exemplary embodiments, the user computing device 12 is a smartphone. In other embodiments, the user computing device 12 can be a tablet computer or other handheld or mobile computing device having a processor and associated memory. In still other embodiments, the user computing device 12 can be a personal computer such as a laptop computer or a desktop computer. In exemplary embodiments, the camera 14 is an integrated camera that is part of a the user computing device 12, e.g., an integrated camera of a smartphone or tablet computer. In other embodiments, the camera 14 may be a separate component of the system that has a wired or wireless connection to the user computing device 12.

The communications network 18 is the Internet in exemplary embodiments. In other embodiments, the communications network can be a local area network (LAN), a wide area network (WAN), a virtual private network (VPN), a wireless radio network (i.e., a cellular telephone communications network), a computer network, or any other suitable communications network capable of receiving and transmitting data. The communications network 18 transmits dimensional data to the remote computing device 20 from the user computing device 12.

The remote computing device 20 is a computer, having a processor and associated memory, which is in a different location than the location of the user computing device 12. The remote computing device 20 can be a server or more than one server. The database 22 is stored, at least in part, on the remote computing device 20. In some embodiments, the database 22 may also be stored in whole or in part on the user computing device 12. Data captured or obtained from the camera 14 and the remote sensing device 16 are stored in the database 22. The database 22 (or a different database) also includes at least one object file, which includes object data related to a real object 60 for displaying a visual object representation corresponding to the real object's shape and dimensions. As shown in FIG. 1, the real object 60 can be, for example, an item of furniture or an item of home décor, e.g., a vase, a lamp, a light fixture, an appliance, a television, a speaker, or other electronic device, a rug, a framed picture, and other home goods or accessories. The visual object representation visually represents the real object 60 in the digital model 510.

The user computing device 12 receives data captured by the camera 14 and transmits that data via the communications network 18 to the remote computing device 20. The user computing device 12 is used by a person, for example, a customer seeking to furnish a room 50.

The remote sensing device 16 measures the spatial dimensions of the room 50 (e.g., length, width, and height). In exemplary embodiments of the system 10, the remote sensing device 16 also measures the spatial dimensions of objects 60 within the room 50, e.g., items of furniture and décor. The remote sensing device 16 is communicatively connected to the user computing device 12. In exemplary embodiments, the remote sensing device 16 is an integrated component of the user computing device 12, but in other embodiments, the remote sensing device can be a separate component of the system 10 that has a wired or wireless connection to the user computing device.

In exemplary embodiments of the system 10, the remote sensing device 16 is a light detection and ranging (lidar; also known as Lidar or LIDAR) device. The lidar device 16 includes one or more lasers that measure the length of time required for light emitted by the one or more lasers to reflect back to the lidar device. Using the foregoing lidar data, the lidar device 16 (or the user computing device 12, the remote computing device 20, or a combination of two or more of the foregoing) create the spatial dimensional data used by the system to create the digital model 510 of the room 50. The lidar device 16 is an integrated component of a smartphone 12 or tablet computer 12 that is the user computing device 12 in the most preferred embodiments of the system. However, in alternate embodiments, the lidar device 16 can be a separate component of the system 10 that has a wired or wireless connection to the user computing device 12.

The remote sensing device 16 and the camera 14 are used to scan the room 50 to obtain data that is used to create the interactive digital model 510 of the room. Using software, the system 10 analyzes at least one image of an indoor space 50 captured by the camera 14 as well as data obtained from the actual room 50 by the remote sensing device 16 (e.g., lidar data). The at least one image includes image data. In some embodiments, the remote sensing device 16 or other components of the system 10 (e.g., the user computing device 12 and/or the remote computing device 20) may also produce dimensional data using the image data obtained from the camera 14 in addition to other spatial dimensional data such as lidar data. Data obtained from the camera 14 and remote sensing device 16 (and any other components of the system 10) concerning the room 50 is dimensional data that the system 10 can analyze and process to create the digital model 510 of the room.

The system's 3D (three-dimensional) space modeling process analyzes and processes the dimensional data to create the digital model 510 of the room 50. The 3D space modeling process determines the dimensions of the room using the dimensional data, isolates the walls, floor, and ceiling planes of the room, and creates a collision meshing to ensure objects (including static structural elements of the room as well as movable objects within the room) are confined. In this way, other digital objects placed into the digital model 510 cannot pass through or overlap space occupied by such objects. Although the 3D space modeling process may utilize photographic data as additional data to create the digital model 510 in some embodiments of the system, in exemplary embodiments, the 3D space modeling process uses 3D point cloud data to model the dimensions and shapes of the room and objects within the room. In some exemplary embodiments, iOS 3D point cloud data provided by the camera and lidar sensor of the user computing device (e.g., an Apple iOS smartphone) can be used as the dimensional data that is received and processed by the system's 3D space modeling process. This data can be captured by the user computing device using the "point-and-shoot" method that will be familiar to users of smartphones and tablet computers who use a similar method to take photographs using their mobile devices. The 3D space modeling process analyzes and processes the point cloud data to render in a format that is displayable in a web browser or other software application using other two-dimensional (2D) and 3D graphics rendering software (e.g., by Unity's WebGL). The digital model 510 is viewable as a visual model representation on a display that is connected to a computing device. The display can be, for example, a computer monitor that has a wired or wireless connection to the user computing device, to the remote computing device, or to another computing device. The digital model 510 has a visual scale, as represented in the visual model representation, that corresponds to the spatial dimensions of the room. The digital model 510 may be manipulated by a user using a pointing device (e.g., a computer mouse). For example, the digital model 510 may be rotated 360 degrees or tilted at various angles and in various directions to provide views of the digital model on the display from different vantage points relative to the user. In this way, the user can visualize the actual room 500 from different vantage points by visually referring to the digital model 510. The 3D space modeling process or another process of the system may also include features that allow other modifications to the digital model such as, for example, changes to flooring, wall coverings, lighting fixtures, appliances, window treatments, doors, entryways, window types, baseboards, crown molding, chair rail, paneling, wainscoting, ceiling types, ceiling coffering, and colors or textures of any of the foregoing. The 3D space modeling process or another process of the system may also include features that allow modifications to "structural" elements of the digital model such as, for example, the addition, removal, or movement of walls, doors, entryways, and windows. The 3D space modeling process or another process of the system may also include features that allow modifications to lighting direction, color, and intensity in the digital model to simulate actual lighting conditions in the room.

The digital model 510 is three-dimensional (3D) as displayed on the display in a web browser or other software application and is dimensionally accurate to scale relative to the room 50. The system allows for depth to be simulated in the digital model 510 that is displayed to the user so that a more realistic and dimensionally accurate representation of the actual room is provided. Once created, the digital model 510 may be stored on a computing device, e.g., on the remote computing device or on the user computing device, for later retrieval for viewing, editing, adding visual object representations, and sharing.

The system's interactive placement process is used to position a visual object representation selected from the database stored on the remote computing device into the visual model representation of the digital model to create an object/model image that is viewable on the display. For example, visual object representations may be created to as visual digital representations of real objects such as, for example, furniture, appliances, electronics, and items of home décor. These visual object representations may be created by the 3D space modeling process or similar software using 3D point cloud data. Each visual object representation may be dimensionally accurate to scale relative to the actual object it visually represents. The visual object representations are stored on a computing device, e.g., on the remote computing device or on the user computing device, for later retrieval for viewing and editing. The visual object representations of the objects may be moved around by a user within the digital model for placement in different locations or points within the digital model. The collision meshing used to create the digital model will prevent the visual object representations from passing through or overlapping space within the digital model that is occupied by static structural or architectural elements or items of décor and other objects that may be present in the actual room and that are digitally represented by visual object representations in the digital model. The interactive placement process may also allow removal, deletion, or replacement of visual object representations corresponding to furniture and other objects present in the room that are present when the dimensional data is captured and added to the initial digital model created by the 3D space modeling process.

Figure 2:
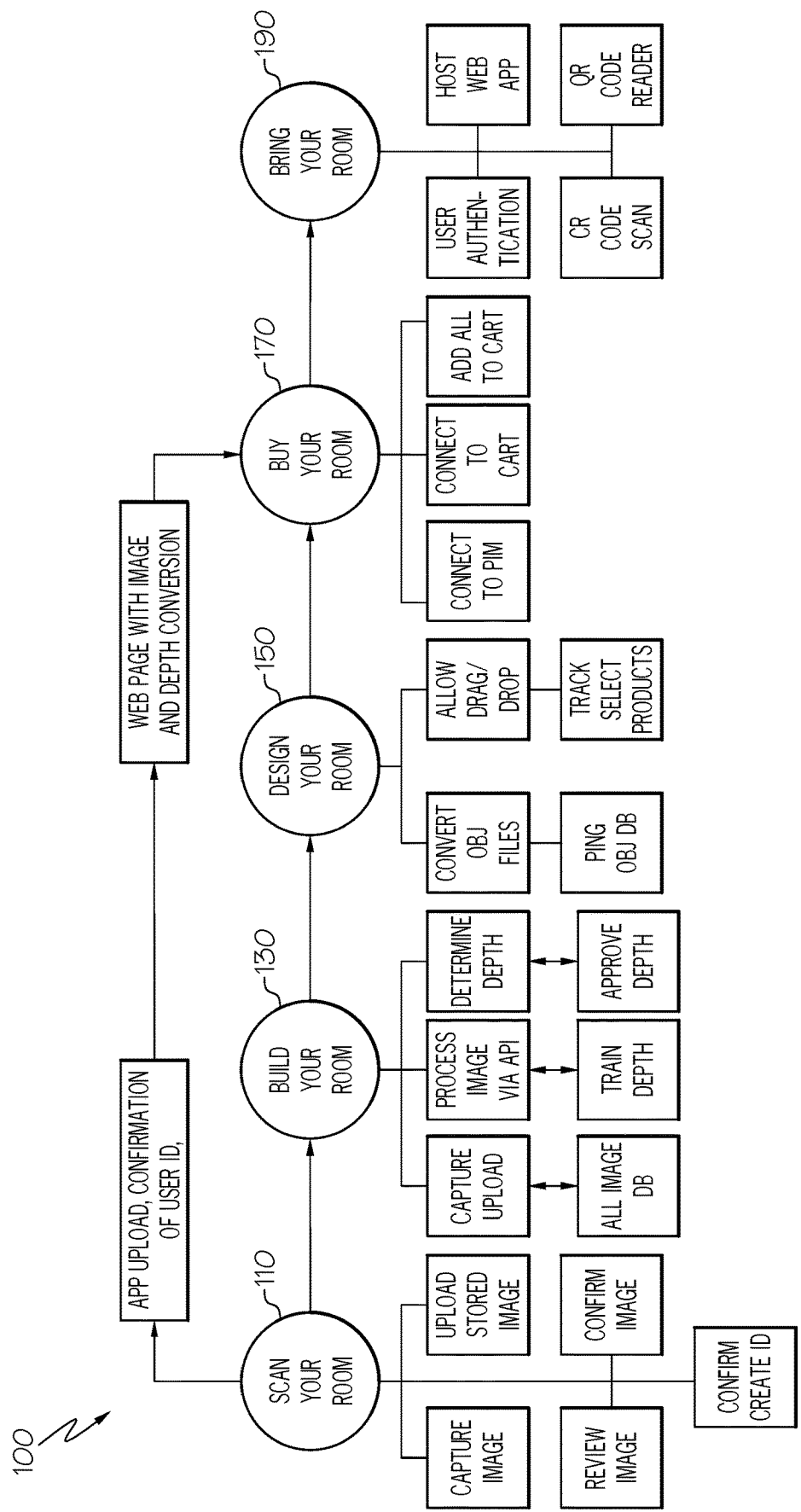
FIG. 2 is a flow chart showing various processes of a system and steps of a method for creating and furnishing a digital model corresponding to the scaled dimensions of a real room or other indoor space.

The system can further include a digital shopping cart containing one or more digital models representing the room, to which visual object representations of various objects (e.g., items of furniture and home décor) have been added. As shown in FIG. 2, a user (e.g., the owner of the user computing device or the owner or tenant of the room) may use the digital shopping cart to purchase all or some of the objects represented by the visual object representations appearing in these "pre-designed" digital models. The system can also include the ability to purchase actual items of furniture, home décor, home goods, accessories, etc., from among the digital equivalents represented by the visual object representations that the user places into the digital model.

The interactive placement process, the digital shopping cart are accessible via a software application (i.e., an "app") downloaded and installed or otherwise installed on the user computing device or via non-downloadable software that is accessible via the communications network on the user computing device using a web browser or other software application.

Figure 5:
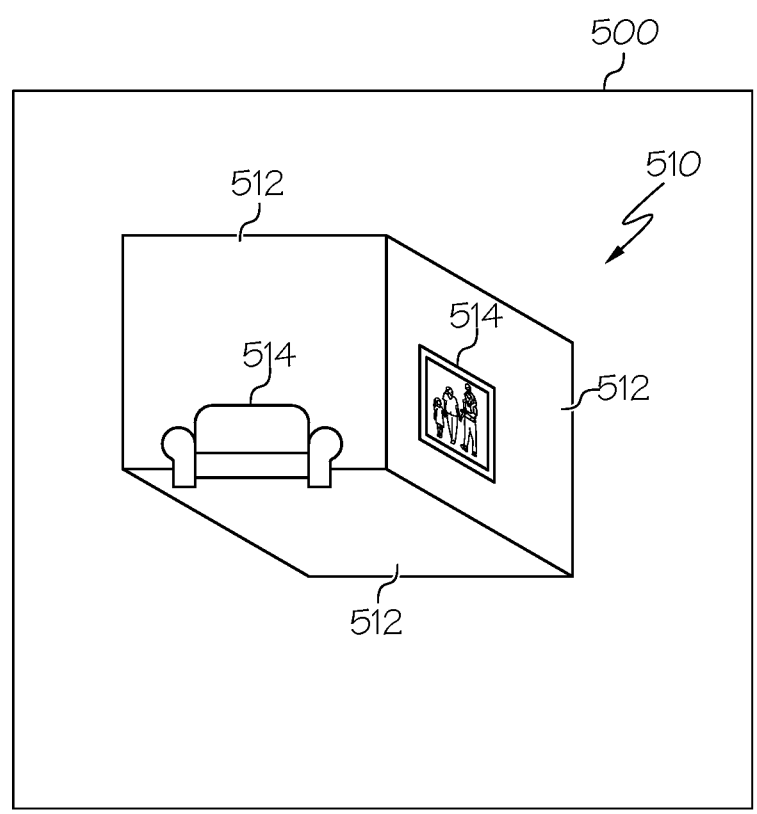
FIG. 5 is a perspective view of a digital model visually representing an indoor space within a digital environment of the machine learning system.

As shown in FIGS. 2 and 5, the invention also relates to methods 100 for creating a digital model 510 of a room 50 or other indoor space and virtually furnishing the digital model. These methods can be performed using systems such as those described elsewhere herein. Exemplary embodiments of these methods 100 include the general steps of scanning a room 110, building a digital model of the room 130, and designing the digital model 150 by adding visual object representations corresponding to actual objects 60. The methods can further include a step of buying one or more of the actual objects represented by the visual object representations added to the digital model during the design step. The methods can further include a step of scheduling delivery of the purchased items.

As explained above, in one step 110 of the method 100, a user scans a room 50 using a user computing device 12 in the manner described for the systems above. Dimensional data is captured and the user may be given an opportunity to review an image of the room captured by a camera of the user computing device to confirm that the image meets the user's requirements for the room or space within the room that the user wishes to use as the digital model for virtual furnishing in order to view how the room would appear with different furniture and other objects. The user may also be given an option to create a user account. In some embodiments, the user may use the system as a guest.

In a next step 130 of the method 100, as described above, the system builds a digital model of the room using the dimensional data, which is analyzed and processed by a 3D space modeling process of the system. In a next step 150 of the method 100, as described above, one or more visual object representations of furniture and other objects may be added to the digital model. These visual object representations may correspond to the size (to scale) and appearance of real items of furniture and other objects that the user may wish to purchase to furnish or decorate the room. The user may add and remove visual object representations to the digital model to view a digital visual representation on a display connected to a computing device so that the user may determine how real items of furniture and décor corresponding to those represented by the added visual object representations would look if placed within the room.

In another step 170 of the method 100, the user may purchase one or more of the real items of furniture and décor corresponding to those represented by the visual object representations added to the digital model. This step may be accomplished by adding such items to a digital shopping cart to place an order for the items and to complete a purchase of them.

In another step 190 of the method 100, the user may schedule delivery of the purchased items. The seller or a shipping or fulfillment agent may use QR codes, bar codes, or other identifying codes or text to identify each purchased item and may use a QR code reader, bar code reader, or other device capable of reading other identifying codes or text to ensure that the correct purchased items are shipped or delivered to the user.

Machine Learning System

Figure 3:
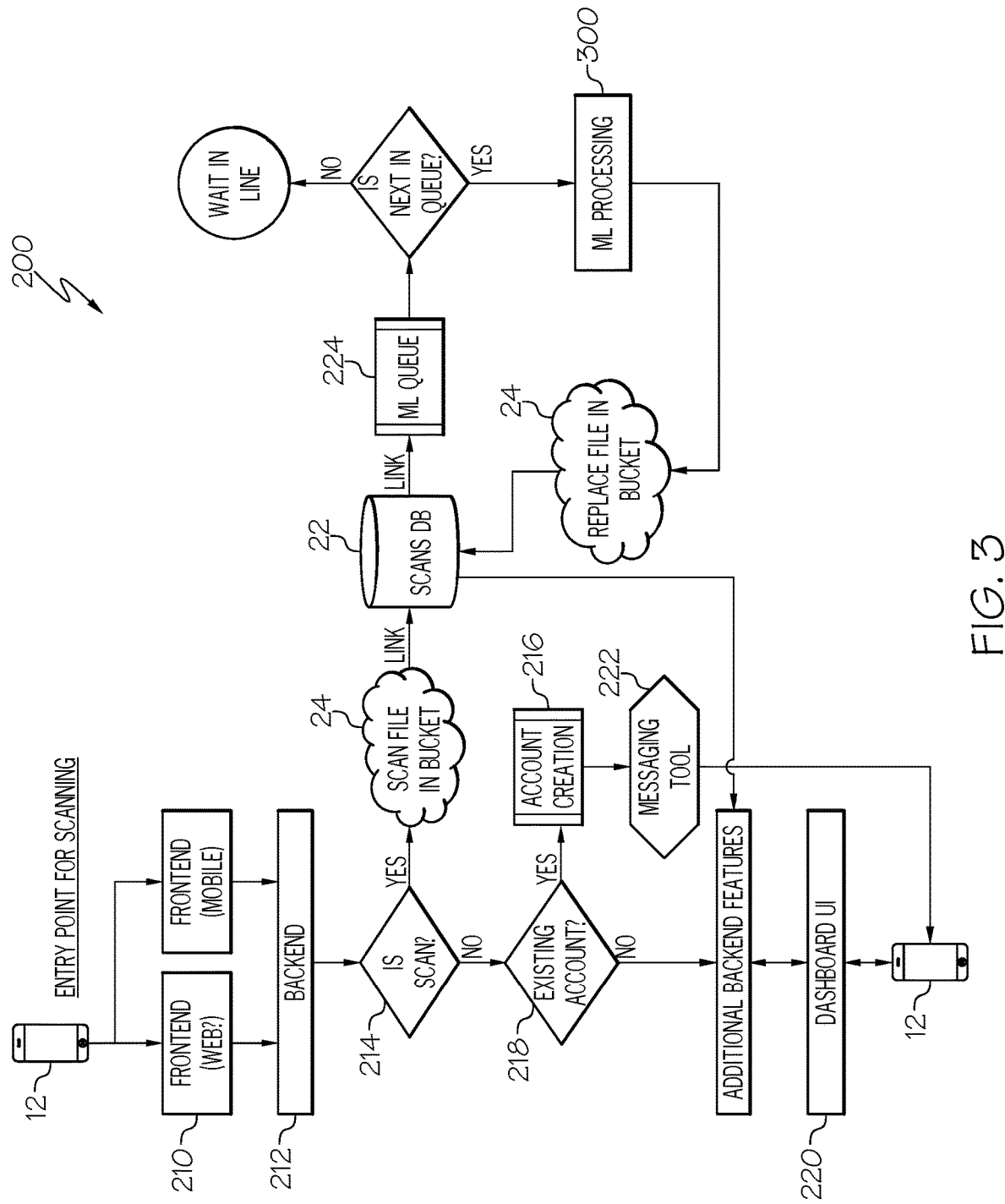
FIG. 3 is a flow chart showing various processes of a system for creating a digital model of an indoor space and detecting an object present therein, including a machine learning system.
Figure 4:
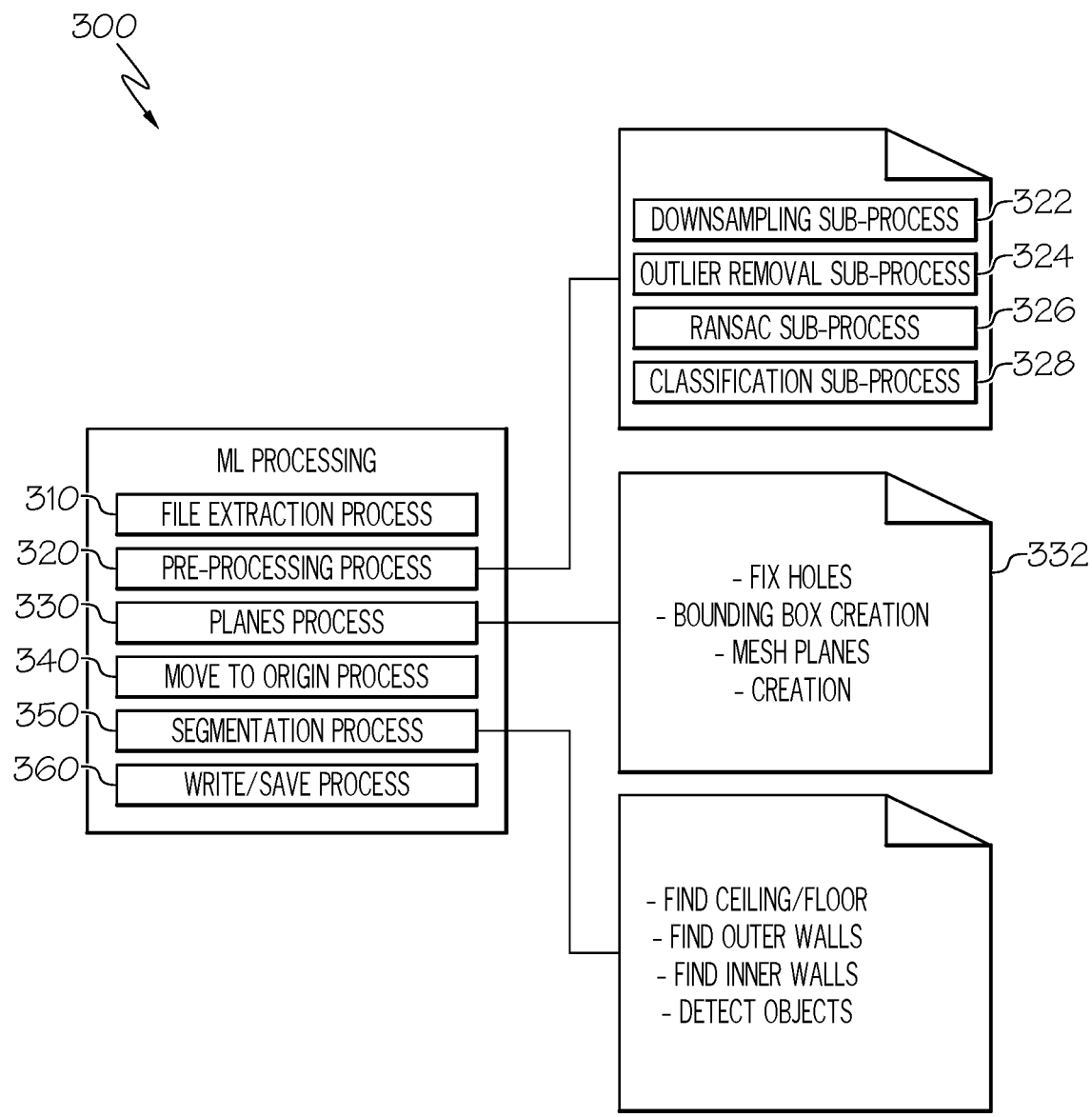
FIG. 4 is a schematic diagram showing various processes and sub-processes of one embodiment of a machine learning system.

As shown in FIGS. 3 and 4, the invention also relates to a machine learning system 200 for processing image data to create a digital model 510 of the indoor space 50 and a visual object representation corresponding to a real object's shape and dimensions. The machine learning system 200 is included in some embodiments of the system 10 for creating a digital model 510 of an indoor space 50. The machine learning system 200 may also remove digital objects 514 corresponding to real objects 60 detected in the indoor space 50 when it is photographed and/or scanned by at least one data collection device such as a camera 14 or lidar device 16. The machine learning system 200 may also add visual object representations (i.e., digital representations of real objects) to the digital model 510 to virtually furnish the digital model as described elsewhere herein above. The visual object representation, which is a digital image of a real object (e.g., an item of furniture or home décor), is three-dimensional in visually representing the real object. The visual object representation is digitally manipulable within the environment of the digital model of the indoor space. For example, control features of the system may be operated to place the visual object representation at a particular location within the indoor model. Other control features of the system may be operated to manipulate and control the orientation of the visual object representation on a display screen based on adjustments to coordinates on x, y, and z axes within the digital model of the indoor space. The visual object representation may be moved, rotated, or both on any of those axes. As one example, a visual object representation of a real sofa may be moved from a first position to a second position on or within the digital model, e.g., from a position against one wall to against another wall in the digital model. As another example, a visual object representation of a real table having a rectangular top may be rotated on a vertical (e.g., z) axis on or within the digital model so that its orientation is changed relative to fixed positions of walls or other visual object representations on or within the digital model. Such virtual rotation mimics the orientation of the real table on a horizontal plane within the real indoor space modeled by the digital model.

The machine learning system utilizes several machine learning processes 300 that function in a series of steps to process the image data. As shown in FIG. 4, the machine learning processes 300 of the machine learning system 200 include a file extraction process 310, a pre-processing process 320, a process 330 for processing planes (hereafter, "the planes process"), a "move to origin" ("MTO") process 340, a process 350 for segmenting visual object representations of real indoor objects 60 from structural elements 512 of the digital model 510 (hereafter, "the segmentation process"), and a write/save process 360 for writing and saving files into a database 22 or into a digital bucket 24. A digital bucket is a type of cloud-based object storage database, e.g., the cloud-based online storage buckets provided by Amazon Web Services under its Amazon S3 services.

The file extraction process 310 of the machine learning system extracts data from files (or data) captured by the camera and other instruments of the computing device such as, for example, from the lidar device of the computing device. For example, the file extraction process 310 may extract certain data (i.e., image data, lidar point cloud data, 3D mesh data, dimensional data, or other data types obtained from scanning or photographing a room using instruments such as the camera or lidar device of the computing device) from a digital photo file. The file extraction process 310 obtains the data from the database for further processing by the machine learning system's other processes.

The pre-processing process 320 of the machine learning system 200 uses sub-processes for downsampling, outlier removal, and random sample consensus (RANSAC). The pre-processing process 320 establishes planes and normals within a point cloud created from the data received from the data collection devices. The downsampling sub-process 322 of the pre-processing process 320 downsamples the image and/or data to reduce its file size for data storage purposes and to facilitate further processing of the data by reducing its file size. By reducing the file size of the data via downsampling, the machine learning system 200 is able to perform additional processing of the data more quickly.

The outlier removal sub-process 324 of the machine learning system's pre-processing process 320 removes data that the outlier removal sub-process deems irrelevant to the digital model 510 of the indoor space 50. For example, any data (e.g., lidar point cloud or mesh data) that is outside of the indoor space is not needed and is removed, including, for example, data in a point cloud or mesh that is outside of the planes of the indoor space. In some embodiments, the outlier removal sub-process 324 may also remove data related to certain objects 60 present in the indoor space 50 when it is photographed or scanned by the camera 14, lidar device 16, or other scanning devices 16 of the computing device 12. Such objects 60 present in the indoor space 50 that are photographed or scanned, and for which the outlier removal sub-process 324 may remove data related to them, can include data related to certain furniture, home décor, and miscellaneous items present in the indoor space. In some instances when desired, control settings of the machine learning system 200 may be adjusted so that all digital objects 514 representing real objects 60 present in the indoor space 50 are treated as outlier data that the outlier removal sub-process 324 removes. In other instances, the control setting may be adjusted so that furniture (or furniture of a certain size, dimensions, or shape, e.g., small furniture such as an occasional table, end table, or ottoman) is treated as outlier data that the outlier removal sub-process removes. In still other instances, the control settings may be adjusted so that home décor items (or home décor items having a certain size, dimensions, or shape) are treated as outlier data that the outlier removal sub-process removes. Examples of home décor items are provided elsewhere herein. In yet other instances, the control settings may be adjusted so that miscellaneous items are treated as outlier data that is removed by the outlier removal sub-process. Miscellaneous items include items of clothing, paper, books, photographs and frames, and other items that are not furniture or home décor. Generally, such miscellaneous items are smaller than furniture and home décor items. The control settings may be adjusted so that photograph and scanned data pertaining to one or more of furniture, home décor items, and miscellaneous items are treated as outlier data and removed by the outlier removal sub-process. In certain instances, the outlier removal sub-process 324 may analyze the data to identify structural elements 52 of the indoor space 50 (e.g., walls, floors, ceilings, doors, windows, and built-in cabinetry or bathroom vanities) so that the outlier removal sub-process makes a determination to remove and does remove all other data not related to those structural elements.

Control settings are accessible via a user interface that is viewable on a display screen that is communicatively connected to the user computing device 12, the remote computing device 20, or another computing device 30.

In some embodiments of the machine learning system 200, the control settings may be adjusted to turn on or off the outlier data removal sub-process 324 based on color of objects photographed or scanned in the indoor space. For example, the outlier removal sub-process 324 may be programmed to make a determination that all items (or only items of a certain type) that are a certain color or color range are outlier data and to remove such outlier data from the digital model. In another example, the outlier removal sub-process 324 may be programmed to make a determination that all items (or only items of a certain type) that are not a certain color or color range are outlier data and to remove such outlier data from the digital model.

The RANSAC sub-process 326 determines the parameters of the digital model 510 of the indoor space 50. The RANSAC sub-process 326 may also determine the parameters of visual object representations for real objects (e.g., furniture or home décor) detected within the indoor space when the camera, lidar device, and any other scanning devices of the computing device photograph or scan the indoor space. The outlier removal sub-process and the RANSAC sub-process 326 may perform their functions in a manner that is complementary, conjunctive, or synergistic to one another. For example, the outlier removal sub-process removes much of the outlier data from the digital model while the RANSAC sub-process 326 determines the parameters of the indoor space as represented in planes of the point cloud or mesh so that together these sub-processes refine the digital model to a more accurate representation of the indoor space it is intended to represent.

The planes process 330 of the machine learning system 200 uses sub-processes 332 to fix holes and gaps in planes of the digital model 510. The planes process 330 creates a digital model of the indoor space from the pre-processed data received from the pre-processing process 320. The planes process 330 creates planes in the digital model 510 that correspond to real structural elements 52 of the indoor space 50, thereby further refining the digital model to a more accurate digital representation of the indoor space. The planes process 330 may also identify one or more digital objects 514 that are not structural elements in the digital model and create a bounding box around each of the one or more digital objects to prevent the one or more digital objects from colliding with and overlapping one another and the structural elements in the digital model. As shown in FIGS. 1 and 5, each of the one or more digital objects 514 includes a visual object representation corresponding to a shape and dimensions of a real object 60 located in the indoor space 50. The bounding box prevents digital objects (such as visual object representations) from passing through or behind or otherwise overlapping planes detected by the pre-processing and planes processes in analyzing the point cloud data to create structural elements in the digital model. For example, such bounding boxes prevent a visual object representation of a sofa from occupying the same screen space within the digital model as an adjacent wall or table, which would cause the sofa to appear visually to pass partially through the wall or table.

The MTO process 340 of the machine learning system 200 positions the digital model 510 at an origin point within a digital environment 500 of the system to align the digital model to a default camera view. The digital environment 500 may be visually represented for display on a display screen that is communicatively connected to a computing device (e.g., the user computing device, the remote computing device, or another computing device). The default camera view can be a digital point of view from which the digital model is viewed that is programmed in the machine learning system. Alternatively, the default camera view can be a digital point of view in the digital model that corresponds to a real point of view from which the at least one data collection device photographed or scanned the indoor space to collect the data that is processed into the digital model. In some cases, scanned data could be rotated, floating above a ground plane, or appear far away from the camera. The MTO process 340 corrects these problems with scanned data by moving and aligning the digital model 510 of the indoor space 50 to a origin (i.e., a 0, 0, 0) point in the digital environment 500 within which the digital model exists. The MTO process 340 operates to correct alignment problems before the segmentation process finds and segments walls, floors, ceilings, and objects in the digital model. The MTO process 340 may not be included in all embodiments of the machine learning system 200.

The segmentation process 350 of the machine learning system 200 defines structural elements 512 in the digital model 510 that correspond to the real structural elements 52 of the indoor space 50. The segmentation process 350 finds and segments floors, ceilings, walls, and other structural elements 512 in the digital model 510 and also detects objects 514 within the digital model. When a digital object 514 is detected, the processes 300 of the machine learning system 200 may be used to create a visual object representation of the digital object. The segmentation process 350 defines structural elements and objects in the digital model by making an identification determination for each plane and object in the digital model. The identification determination is an identification that a plane is a floor, ceiling, wall, or another structural element of the indoor space or an identification that an object is detected in the digital model that does not correspond to one of the real structural elements of the indoor space. Thus, in analyzing the point cloud or mesh data, the segmentation process 350 will make a wall determination when it detects a plane in the data that corresponds to a wall in the indoor space, a ceiling determination when it detects a plane in the data that corresponds to a ceiling in the indoor space, a floor determination when it detects a plane in the data that corresponds to a floor in the indoor space, and an object determination when it detects a digital object in the digital model that does not correspond to a structural element. The segmentation process 350 creates segmented point clouds and segmented meshes.

The machine learning system 200 includes a control setting that allows for object removal from a digital model 510. When the digital model 510 is to represent an empty indoor space in which new furniture and home décor are to be placed, the object removal control setting permits rapid removal of all digital objects 514 from the digital model that are not structural elements 512. A furniture retailer, interior designer, or another user can then use the system to add visual object representations of other furniture or home décor to the digital model to provide a visual representation of how the indoor space would appear with the new proposed furnishings.

The user (e.g., a customer seeking to purchase new furniture or home décor) can scan the user's room 500 using the user's computing device 12, which in most cases will be the user's smartphone. The room 50 can be any indoor space including, but not limited to, a living room, a dining room, a kitchen, a bedroom, a media room, a bathroom, a laundry room, an office, a conference room, a classroom, a lobby, or any other room in a house or building. In some uses, the indoor space 50 is an interior of a warehouse. In some embodiments, the machine learning system 200 may also be used to scan a covered outdoor space such as a porch, a balcony or veranda, or gazebo for which furniture or décor is desired; however, in most instances, such covered outdoor space must have at least one wall, a floor, and a ceiling. The user may scan the room "as is" without removing any furniture or other objects. A frontend 210 of the machine learning system 200, which allows the user to scan the indoor space, is accessed on the user's computing device using an app or a website having non-downloadable software that is accessed via a browser installed on the computing device. Scanning the room can include photographing the room 50 with a camera 14 of the computing device 12, scanning the room with a lidar device 16 or other scanning device 16 of the computing device 12, or both. In exemplary embodiments of the machine learning systems and methods, scanning includes both photographing and scanning the room with a camera 14 and a lidar device 16 of the computing device 12 from which point cloud and mesh data are obtained and/or created.

The data collected by the user's computing device 12 is transmitted via a communications network 18 (e.g., the Internet or cellular network) to a remote server 20 that includes backend processing 212 of such data. Such backend processing 212 can include a scan determination process 214 that analyzes the data received from the computing device to detect whether the data is scanned data of the indoor space or other data. If the data is not scanned data of the indoor space, the user may receive a prompt on a user interface 220. Such prompt can be, for example, to create a new account 216, to log into an existing account 218, to make a payment, a reminder of items added to an electronic shopping cart, or other similar electronic prompts that are displayed or otherwise communicated by the computing device to the user. The user interface 220 may be accessible through the user's computing device 12 via the app or website or on another computing device (e.g., a computing device at a furniture retailer's store or on an interior designer's computer). Similar to embodiments allowing access on the user's computing device 12, the user interface 220 may be accessed on another computing device 30 via an application (e.g., an application installed on a personal, laptop, or tablet computer) or a website as non-downloadable software.

In some embodiments, the system may include a messaging tool or program 222 having messaging (e.g., instant message, SMS, or MMS) capabilities.

If the backend processing performed by the system 200 detects that the data received by the remote server for backend processing is scanned data, the scanned data (e.g., a photograph or other image data captured by a camera 14 or point cloud data collected by scanning performed by a lidar device 16) is transmitted to a database 22. In some embodiments, such data may be transmitted first to a digital bucket 24 for receiving scanned data and then from the digital bucket to a database 22 in which scanned data is stored.

The machine learning system 200 can include a machine learning queue 224 (e.g., a digital bucket or other application or database) in which new scanned data received from a user's computing device 12 is placed in queue for processing by sub-processes of the system 300 for creating the digital model. In exemplary embodiments, scanned data is transmitted from the database 22 to the machine learning queue 224. The database 22 may include an application that pushes scanned data to the machine learning queue 224, or the machine learning queue can include an application that pulls (or polls) scanned data from the database into the machine learning queue. The machine learning queue 224 is used to prioritize and to increase the efficiency and speed of processing of the scanned data especially in cases in which scanned data is received from multiple users of the system simultaneously or near simultaneously. The processing of the scanned data may be prioritized by processing the scanned data based on time of receipt by the remote server or in the database in which scanned data is stored. If scanned data is not next in the queue based on such time considerations, the scanned data will wait in line in the machine learning queue until no other scanned data from other users is ahead of it in terms of time of receipt, at which time the scanned data will be processed by the sub-processes of the machine learning system to create a digital model of the indoor space.

Figure 6:
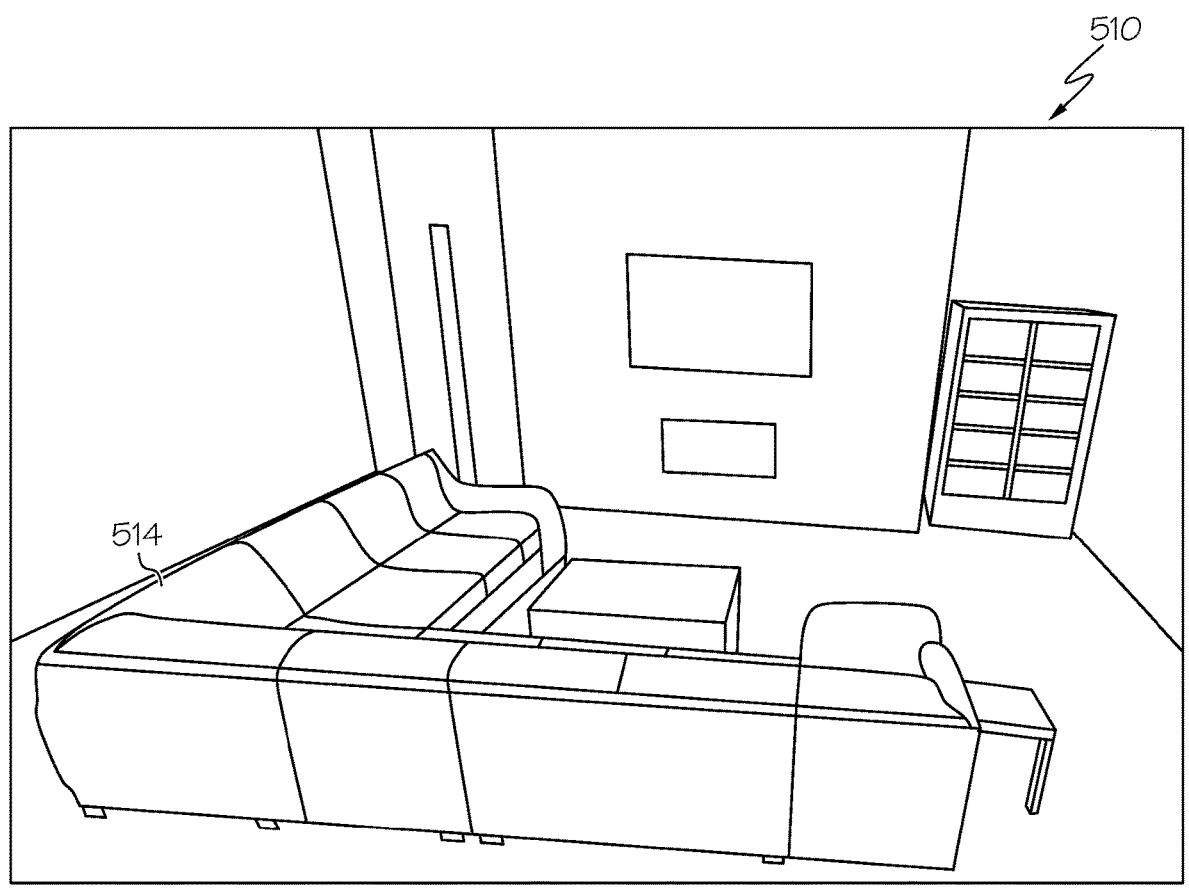
FIG. 6 is a screenshot of a digital model of a scanned room including digital objects represented therein.
Figure 7:
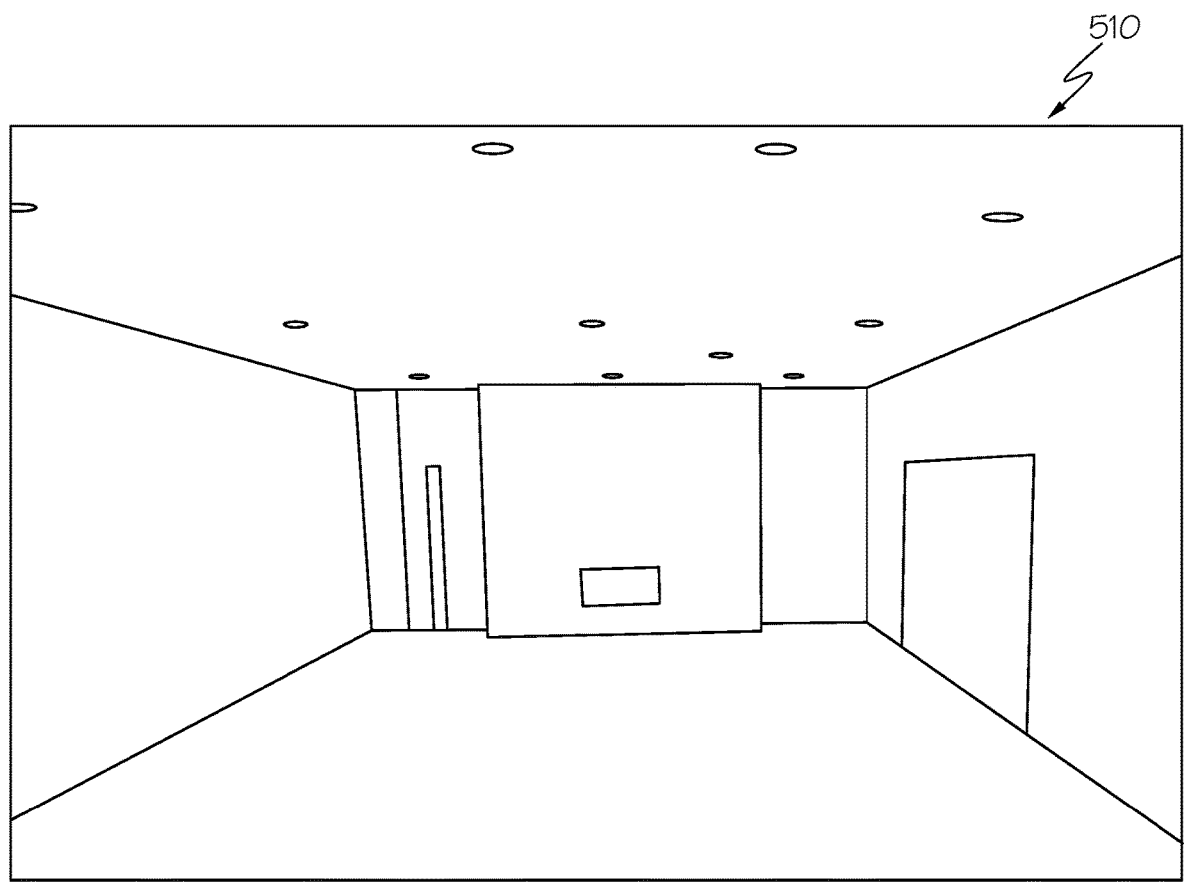
FIG. 7 is a screenshot of the digital model of FIG. 6 after processing to remove digital objects using machine learning processes.

If the scanned data is the only scanned data in the machine learning queue, or if the scanned data of a user is first in line of priority for processing based on time considerations described above, the machine learning system will commence machine learning processing of the scanned data to create a digital model of the indoor space as shown in FIG. 6. As shown in FIG. 7, such machine learning processing may also include additional processing to remove objects detected in the scanned data that do not correspond to structural elements of the digital model or to create visual object representations of objects detected in the scanned data for placement and display in the digital model. The machine learning sub-processes are described elsewhere herein both above and in the following examples.

After the machine learning processes 300 and their sub-processes have created the digital model 510, the write/save process 360 will write and save the digital model to a database 22. In one embodiment, the write/save process 360 first writes and saves the digital model 510 to a digital bucket 24, and from the digital bucket, the digital model is saved in a database 22. This database 22 can be the same database in which the original scanned data received by the remote computing device 20 was saved or a different database.

Before the digital model 510 is made available for viewing by the user, additional backend processing may be performed. As an example, visual object representations of real furniture or home décor items selected by the user or by a merchant or interior designer may be added to the digital model so that, when viewed in the user interface on a display, the digital model 510 provides the user with an accurate visual representation of how the indoor space 50 would appear if the actual, real furniture or home décor items were placed into the indoor space.

An object detected as being present in the indoor space 50 during scanning is a real object 60 (e.g., furniture or other object) that is not a structural element 52 of the indoor space, which is present and detected in the indoor space when the data is collected by the at least one data collection device. The system may be used to create a visual object representation that is or includes a digital object having characteristics that correspond to characteristics of the real object. Such characteristics shared between the real object and the visual object representation can include scaled dimensions, shape, and color.

Example 1

In one exemplary embodiment of a machine learning system for processing data obtained from photographing or scanning an indoor space to create a digital model of the indoor space, the system includes a file extraction process, a pre-processing process, a planes process, a segmentation process, and a write/save process. The file extraction process extracts data from a data source transmitted by a computing device to a remote computing device. The data source is or includes data related to an indoor space that is collected by at least one of a camera, a lidar device, and a dimensional scanner. Extracted data is created from the data processed by the file extraction process. The pre-processing process identifies and removes outlier data contained in the extracted data received from the file extraction process and classifies the extracted data to add a classification relating to a type of object in the indoor space. Pre-processed data is created from the extracted data processed by the pre-processing process. The planes process creates a digital model of the indoor space from the pre-processed data received from the pre-processing process. The planes process creates planes in the digital model that correspond to real structural elements of the indoor space. The segmentation process defines structural elements in the digital model that correspond to the real structural elements of the indoor space. The write/save process writes and saves the digital model in a database. The digital model is displayable and editable via a user interface displayed on a display screen of the computing device or another computing device.

The structural elements are planes in the digital model corresponding to the real structural elements of the indoor space, e.g., walls, floors, ceilings, columns, and other features that are architectural and structural rather than objects that were present inside the indoor space.

In this embodiment of the machine learning system, the system may further include a user computing device, which can be a smartphone or a tablet computer. In alternate embodiments, the computing device can be a laptop computer, a desktop computer, or any other suitable computing device, although computing devices that are also mobile or portable devices are preferred. The computing device includes a processor, an associated memory, and at least one data collection device for collecting data related to the indoor space. The at least one data collection device can be a camera, a lidar device, or another scanning device for scanning the indoor space to collect data. In exemplary embodiments, the computing device includes both a camera and a lidar device.

After the pre-processing process creates processed data from the extracted data, the planes process creates a point cloud from the pre-processed data. The planes process refines the point cloud to create the digital model, which is or includes a mesh model of the indoor space. The planes process also identifies holes and gaps in and between planes of the mesh model and modifies the mesh model to correct any such holes and gaps therein. The planes process creates point clouds and mesh planes using the pre-processed data, e.g., the planes process may first create a point cloud of the indoor space using the pre-processed data, which originated from the photograph and scan data collected by the at least one data collection device.

The planes process may also identify one or more digital objects that are not structural elements in the digital model and create a bounding box around each of the one or more digital objects to prevent the one or more digital objects from colliding with and overlapping one another and the structural elements in the digital model. Each of the one or more digital objects includes a visual object representation corresponding to a shape and dimensions of a real object located in the indoor space.

Using the mesh model created by the planes process, the segmentation process creates the digital model in a final format that is viewable on a display screen that is communicatively connected to the user computing device (e.g., the mobile device such as a smartphone of a user inside or with access to the indoor space) or to another computing device. The segmentation defines structural elements and objects in the digital model by making an identification determination for each plane and object in the digital model. The identification determination is an identification that a plane is a floor, ceiling, wall, or another structural element of the indoor space or an identification that an object is detected in the digital model that does not correspond to one of the real structural elements of the indoor space. Examples of other structural elements include doors, windows, columns, bars, and cabinetry, and bathroom vanities.

This embodiment of the machine learning system can further include a MTO process for positioning the digital model at an origin point to align the digital model to a default camera view. The MTO process corrects problems that arise when scanned data represented visually in the digital model is rotated, floating above a ground plane, or appear far away from the camera. The MTO process corrects these problems with scanned data by moving and aligning the digital model of the indoor space to a origin (i.e., a 0, 0, 0) point in the digital environment within which the digital model exists. The MTO process operates to correct alignment problems before the segmentation process finds and segments walls, floors, ceilings, and objects in the digital model.

Example 2

In another exemplary embodiment of a machine learning system for creating a digital model of an indoor space and objects present in the indoor space, the system includes a computing device, one or more remote computing devices, and a communications network. The computing device includes a processor, an associated memory, and at least one data collection device for collecting data related to the indoor space. The at least one data collection device is or includes a camera, a lidar device, or another scanning device for scanning the indoor space to collect data related to structural elements of the indoor space, an object present in the indoor space, or both. The system further includes a pre-processing process, a planes process, a segmentation process, and a write/save process. The pre-processing process identifies and removes outlier data contained in the data received from the computing device and classifies the data to add a classification relating to a type of the object in the indoor space. Pre-processed data is created from the data processed by the pre-processed process. The planes process creates a digital model of the indoor space from the pre-processed data received from the pre-processing process. The planes process creates planes in the digital model that correspond to real structural elements of the indoor space. The segmentation process defines structural elements in the digital model that correspond to the real structural elements of the indoor space. The write/save process writes and saves the digital model in a database. The computing device transmits the data collected by the at least one data collection device via the communications network to the one or more remote computing devices for processing by the pre-processing process, the planes process, and the segmentation process to create the digital model of the indoor space. The digital model is viewable and editable on a display screen of the computing device, the one or more remote computing devices, or another computing device.

As in Example 1, this embodiment of the machine learning system also can further include a MTO process for positioning a visual object representation in the digital model.

The segmentation process defines structural elements and objects in the digital model by making an identification determination for each plane and object in the digital model. The identification determination is an identification that a plane is a floor, ceiling, wall, or another structural element of the indoor space or an identification that an object is detected in the digital model that does not correspond to one of the real structural elements of the indoor space.

Methods

The invention also features methods for creating a digital model of an indoor space. The methods are performed using the devices and systems described elsewhere herein or similar such devices and systems. In one exemplary embodiment of such a method, the method for creating the digital model includes the step of collecting data related to an indoor space. This initial step includes the step of photographing, scanning, or both photographing and scanning the indoor space using at least one data collection device.

Next, the method includes the step of creating a digital model of the indoor space. This step of the method includes the steps of identifying and removing outlier data contained in the data received from the at least one data collection device to create pre-processed data. This step of the method also includes the step of creating the digital model of the indoor space from the pre-processed data by creating planes in the digital model that correspond to real structural elements of the indoor space. This step of the method further includes the step of defining structural elements in the digital model that correspond to the real structural elements of the indoor space. Defining the structural elements in the digital model includes the step of making an identification determination for each plane in the digital model. The identification determination is or includes an identification that a plane is a floor, ceiling, wall, or another structural element of the indoor space.

Finally, the method includes the step of writing and saving the digital model in a database from which the digital model is accessible for viewing on a display screen In some embodiments, the method can include additional steps for collecting data related to an object present in the indoor space. Data related to the object is collected by photographing, scanning, or both photographing and scanning the object using the at least one data collection device. In a next step, a visual object representation of the object is created. The step of creating the visual object representation includes the step of identifying and removing outlier data contained in the data received from the at least one data collection device to create pre-processed data. The step of creating the visual object representation also includes the step of classifying the data to add a classification relating to a type of the object in the indoor space. The step of creating the visual object representation also includes the step of creating planes in the digital model that correspond to a shape and scaled size of the object. This step can be performed using the pre-processed data. In a next step of creating the visual object representation, the visual object representation is positioned in the digital model. In a next step, the visual object representation is written and saved in a database from which the visual object representation is accessible for viewing on a display screen and for repositioning within or removal from the digital model. The object is a real object that is not a structural element of the indoor space, which is present and detected in the indoor space when the data is collected. The visual object representation is or includes a digital object having characteristics that correspond to characteristics of the real object.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for processing data obtained from photographing or scanning an indoor space to create a digital model of the indoor space, wherein the system comprises:
    a file extraction process for extracting data from a data source transmitted by a computing device to a remote computing device, wherein the data source comprises data related to an indoor space that is collected by at least one of a camera, a lidar device, and a dimensional scanner; wherein extracted data is created from the data processed by the file extraction process;
    a pre-processing process for identifying and removing outlier data contained in the extracted data received from the file extraction process, and for classifying the extracted data to add a classification relating to a type of object in the indoor space; wherein pre-processed data is created from the extracted data processed by the pre-processing process;
    a planes process for creating a digital model of the indoor space from the pre-processed data received from the pre-processing process; wherein the planes process creates planes in the digital model that correspond to real structural elements of the indoor space;
    a segmentation process for defining structural elements in the digital model that correspond to the real structural elements of the indoor space; and
    a write/save process for writing and saving the digital model in a database.

2. The system of claim 1, further comprising a computing device, wherein the computing device comprises a processor, an associated memory, and at least one data collection device for collecting data related to the indoor space.

3. The system of claim 2, wherein the at least one data collection device comprises a camera, a lidar device, or another scanning device for scanning the indoor space to collect data.

4. The system of claim 1, wherein the planes process creates a point cloud from the pre-processed data; wherein the planes process refines the point cloud to create the digital model, which comprises a mesh model of the indoor space.

5. The system of claim 4, wherein the planes process identifies holes and gaps in and between planes of the mesh model and modifies the mesh model to correct any holes and gaps therein.

6. The system of claim 4, wherein the planes process identifies one or more digital objects that are not structural elements in the digital model and creates a bounding box around each of the one or more digital objects to prevent the one or more digital objects from colliding with and overlapping one another and the structural elements in the digital model.

7. The system of claim 1, wherein the structural elements comprise planes in the digital model corresponding to the real structural elements; wherein the real structural elements comprise walls, floors, ceilings, and other structural surfaces in the indoor space.

8. The system of claim 1, further comprising a digital object removal process for removing one or more digital objects from the digital model; wherein the one or more digital objects are not structural elements in the digital model.

9. The system of claim 1, wherein the planes process creates point clouds and mesh planes using pre-processed data and the segmentation process creates the digital model in a final format that is viewable on a display screen that is communicatively connected to the computing device or to another computing device.

10. The system of claim 1, wherein the system further processes the data to create a visual object representation corresponding to a shape and dimensions of a real object located in the indoor space.

11. The system of claim 1, wherein the segmentation defines structural elements and objects in the digital model by making an identification determination for each plane and object in the digital model; wherein the identification determination comprises an identification that a plane comprises a floor, ceiling, wall, or another structural element of the indoor space or an identification that an object is detected in the digital model that does not correspond to one of the real structural elements of the indoor space.

12. The system of claim 1, further comprising a move to origin ("MTO") process for positioning the digital model at an origin point to align the digital model to a default camera view.

13. The system of claim 1, wherein the digital model is displayable and editable via a user interface displayed on a display screen of the computing device or another computing device.

14. A system for creating a digital model of an indoor space and objects present in the indoor space, wherein the system comprises:
    a computing device comprising a processor, an associated memory, and at least one data collection device for collecting data related to the indoor space; wherein the at least one data collection device comprises a camera, a lidar device, or another scanning device for scanning the indoor space to collect data related to structural elements of the indoor space, an object present in the indoor space, or both;
    one or more remote computing devices;
    a communications network;
    a pre-processing process for identifying and removing outlier data contained in the data received from the computing device, and for classifying the data to add a classification relating to a type of the object in the indoor space; wherein pre-processed data is created from the data processed by the pre-processed process;

a planes process for creating a digital model of the indoor space from the pre-processed data received from the pre-processing process; wherein the planes process creates planes in the digital model that correspond to real structural elements of the indoor space;

a segmentation process for defining structural elements in the digital model that correspond to the real structural elements of the indoor space; and a write/save process for writing and saving the digital model in a database;

wherein the computing device transmits the data collected by the at least one data collection device via the communications network to the one or more remote computing devices for processing by the pre-processing process, the planes process, and the segmentation process to create the digital model of the indoor space;

wherein the digital model is viewable and editable on a display screen of the computing device, the one or more remote computing devices, or another computing device.

15. The system of claim 14, further comprising a move to origin ("MTO") process for positioning the digital model at an origin point to align the digital model to a default camera view.

16. The system of claim 14, wherein the segmentation process defines structural elements and objects in the digital model by making an identification determination for each plane and object in the digital model; wherein the identification determination comprises an identification that a plane comprises a floor, ceiling, wall, or another structural element of the indoor space or an identification that an object is detected in the digital model that does not correspond to one of the real structural elements of the indoor space.

17. A method for creating a digital model of an indoor space, wherein the method comprises the steps of:
(a) collecting data related to an indoor space, wherein collecting the data comprises the step of photographing, scanning, or both photographing and scanning the indoor space using at least one data collection device;
(b) creating a digital model of the indoor space, wherein creating the digital model comprises the steps of:
(i) identifying and removing outlier data contained in the data received from the at least one data collection device to create pre-processed data;
(ii) creating the digital model of the indoor space from the pre-processed data by creating planes in the digital model that correspond to real structural elements of the indoor space; and
(iii) defining structural elements in the digital model that correspond to the real structural elements of the indoor space; wherein defining the structural elements in the digital model comprises the step of making an identification determination for each plane in the digital model; wherein the identification determination comprises an identification that a plane comprises a floor, ceiling, wall, or another structural element of the indoor space; and
(c) writing and saving the digital model in a database from which the digital model is accessible for viewing on a display screen.

18. The method of claim 17, further comprising the steps of:
(d) collecting data related to an object, wherein collecting the data comprises the step of photographing, scanning, or both photographing and scanning the object using the at least one data collection device;
(e) creating a visual object representation of the object, wherein creating the visual object representation comprises the steps of:
(i) identifying and removing outlier data contained in the data received from the at least one data collection device to create pre-processed data;
(ii) classifying the data to add a classification relating to a type of the object;
(iii) creating the visual object representation from the pre-processed data by creating planes in the digital model that correspond to a shape and scaled size of the object; and
(iv) positioning the visual object representation in the digital model; and
(f) writing and saving the visual object representation in a database from which the visual object representation is accessible for viewing on a display screen and for repositioning within or removal from the digital model;
wherein the object comprises a real object that is not a structural element of the indoor space; wherein the visual object representation comprises a digital object comprising characteristics that correspond to characteristics of the real object.

* * * * *